(12) United States Patent
Ohki

(10) Patent No.: US 6,688,872 B2
(45) Date of Patent: Feb. 10, 2004

(54) APPARATUS FOR MAKING UNVULCANIZED RUBBER TAPE

(75) Inventor: Masahiko Ohki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 40 days.

(21) Appl. No.: 09/974,859

(22) Filed: Oct. 12, 2001

(65) Prior Publication Data

US 2002/0048615 A1 Apr. 25, 2002

(30) Foreign Application Priority Data

Oct. 23, 2000 (JP) .................................. 2000-322887

(51) Int. Cl.$^7$ .......................... B29C 47/16; B29C 47/92
(52) U.S. Cl. .................. 425/145; 425/327; 425/335; 425/363; 425/376.1; 425/461
(58) Field of Search ............................. 425/145, 190, 425/192 R, 327, 335, 363, 376.1, 461

(56) References Cited

U.S. PATENT DOCUMENTS

| | | | | |
|---|---|---|---|---|
| 3,728,056 A | * | 4/1973 | Theysohn | 425/145 |
| 3,871,810 A | * | 3/1975 | Geyer | 425/374 |
| 3,890,078 A | * | 6/1975 | Straumanis | 425/145 |
| 4,124,346 A | * | 11/1978 | Greenwood et al. | 425/192 R |
| 4,217,322 A | * | 8/1980 | Sugano et al. | 425/461 |
| 5,176,925 A | * | 1/1993 | Weber et al. | 425/461 |
| 5,179,521 A | * | 1/1993 | Edge | 425/145 |
| 5,221,541 A | * | 6/1993 | Arbour et al. | 425/461 |

FOREIGN PATENT DOCUMENTS

| | | |
|---|---|---|
| EP | 1 033 236 A2 | 9/2000 |
| FR | 2 673 141 A1 | 8/1992 |

OTHER PUBLICATIONS

Database WPI, Section Ch, Week 198649, Derwent Publications Ltd., London, XP002216186.

* cited by examiner

Primary Examiner—Robert Davis
Assistant Examiner—Joseph S Del Sole
(74) Attorney, Agent, or Firm—Birch, Stewart, Kolasch & Birch, LLP

(57) ABSTRACT

An apparatus is provided for making an unvulcanized rubber tape having a finished thickness TO in a range of from 0.3 to 1.5 mm, comprising an extruder which includes a passage for unvulcanized rubber defining an outlet for the extruded unvulcanized rubber, and a pair of calendar rollers disposed near the outlet for adjusting the thickness of the extruded unvulcanized rubber passing therebetween, wherein the passage is comprised of a transforming part having an inlet for the unvulcanized rubber at its upstream-side end, and a thinning part on the downstream side thereof defining the outlet at its downstream-side end, with the transforming part gradually changing in the cross sectional shape from a circle to a flat shape in the lower course of the passage, and the thinning part having a flat cross sectional shape and gradually decreasing in thickness in the lower course of the passage.

5 Claims, 6 Drawing Sheets

APPARATUS FOR MAKING UNVULCANIZED RUBBER TAPE

The present invention relates to an apparatus for making a thin unvulcanized rubber tape having a thickness in a range of from 0.3 to 1.5 mm.

Conventionally, unvulcanized rubber tires are made of unvulcanized rubber components having various shapes and sizes. As the unvulcanized rubber components are formed by extruders, the number and sizes of the extruders are depend on the maximum size and the number of the kinds of the rubber components. Usually, at least several extruders which are relatively large-sized are required.

In recent years, in order to decrease the number and size of extruders to decrease the plant size and to establish a flexible manufacturing system, it was proposed to make a pneumatic tire by winding an unvulcanized rubber tape G around a drum directly or indirectly thereon instead of applying a rubber component. For example, as shown in FIG. 7 which shows a tread rubber B having a trapezoidal cross sectional shape, a rubber tape G is overlap-wound across the width thereof. Therefore, on the surface of the formed rubber component B or the windings of the tape G, uneven part is formed due to the edges C of the windings of the tape G. Such unevenness of the surface can be prevented by using a very thin rubber tape having a thickness of 0.3 to 1.5 mm.

It is not difficult to decrease the thickness of unvulcanized rubber in itself. The thickness can be easily decreased by rolling, but due to the elasticity and adhesiveness, it is difficult to stably obtain a constant thickness without breakage. Further, it is also difficult to obtain a constant width. As a result an additional work to cut the edges of the rolled rubber tape into the predetermined width is necessitated.

It is therefore, an object of the present invention to provide an apparatus which can stably make an unvulcanized rubber tape with accuracy in width and thickness although the thickness is in a very small range of 0.3 to 1.5 mm.

According to the present invention an apparatus for making an unvulcanized rubber tape comprises an extruder comprising a passage for unvulcanized rubber having an outlet for the extruded unvulcanized rubber, and a pair of calender rollers disposed near the outlet for adjusting the thickness of the extruded unvulcanized rubber passing therebetween, wherein the passage is made up of a transforming part having an inlet for the unvulcanized rubber at its upstream-side end, and a thinning part on the downstream side thereof defining the above-mentioned outlet at its downstream-side end, the transforming part gradually changes in the cross sectional shape from a circle to a flat shape in the lower course of the passage, the thinning part has a flat cross sectional shape and gradually decreases in the thickness in the lower course of the passage, and a width W0 and a thickness T0 of the unvulcanized rubber tape, a width W1 of the inlet, a width WA and a thickness TA of the outlet, a length L of the transforming part, a width W2 of the transforming part at its downstream-side end, and a pressure P of the unvulcanized rubber flowing into the inlet satisfy the following relationships $0.7 \times W0 \leq WA \leq 1.0 \times W0$
$1.5 \times T0 \leq TA \leq 10 \times T0$
$WA < W2 < W1 + 0.2 \times L$
$P > 40$ kgf/sq.cm.

An embodiment of the present invention will now be described in detail in conjunction with the accompanying drawings.

Figure 6:
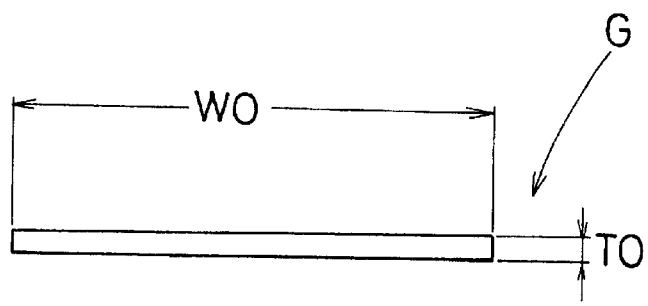
FIG. 6 is a diagram showing the unvulcanized rubber tape.
Figure 7:
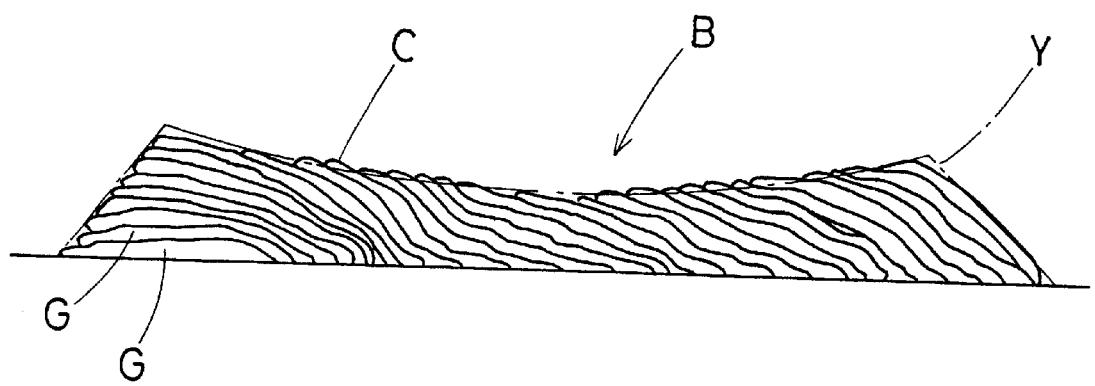
FIG. 7 is a cross sectional view showing a rubber component made by winding an unvulcanized rubber tape.

In the drawings, apparatus 1 for making an unvulcanized rubber tape according to the present invention comprises an extruder 3 and a pair of calender rollers 19U and 19L. An unvulcanized rubber tape G to be made by the apparatus 1 has, as shown in FIG. 6, a predetermined finished thickness T0 in a range of from 0.3 to 1.5 mm, and a predetermined finished width W0 in a range of from 5 to 50 mm.

The extruder 3 comprises a cylinder block 10 with a cylinder head 6, a worm screw 9 therein, and an electric motor M for driving the worm screw 9, a die 12 attached to the cylinder head 6.

The cylinder block 10 is provided with a hole 10H in which the worm screw 9 is disposed. The hole 10H extends to the front end of the cylinder block 10 to open thereat, while keeping the same circular cross sectional shape. This opening 2 of the hole 10H is at a certain distance J from the front end of the worm screw 9 so as to form a rubber pool 17 therebetween. The rear end of the hole 10H is connected to an input port 10A for material rubber compound.

The worm screw 9 is connected to the electric motor M through a reduction gear.

The cylinder head 6 is fixed to the front end of the cylinder block 10 by means of bolts which penetrate through holes of a flange 10B formed at the front end of the cylinder block 10 and engage with threaded holes formed on the back face of the cylinder head 6. The cylinder head 6 is provided on the front face with a hollow part for mounting the die 12. The cylinder head 6 is provided with a hole 15 which extends from the rear end of the cylinder head 6 continuously from the hole 10H and opens at the rear end of the hollow part for mounting the die 12.

Figure 1:
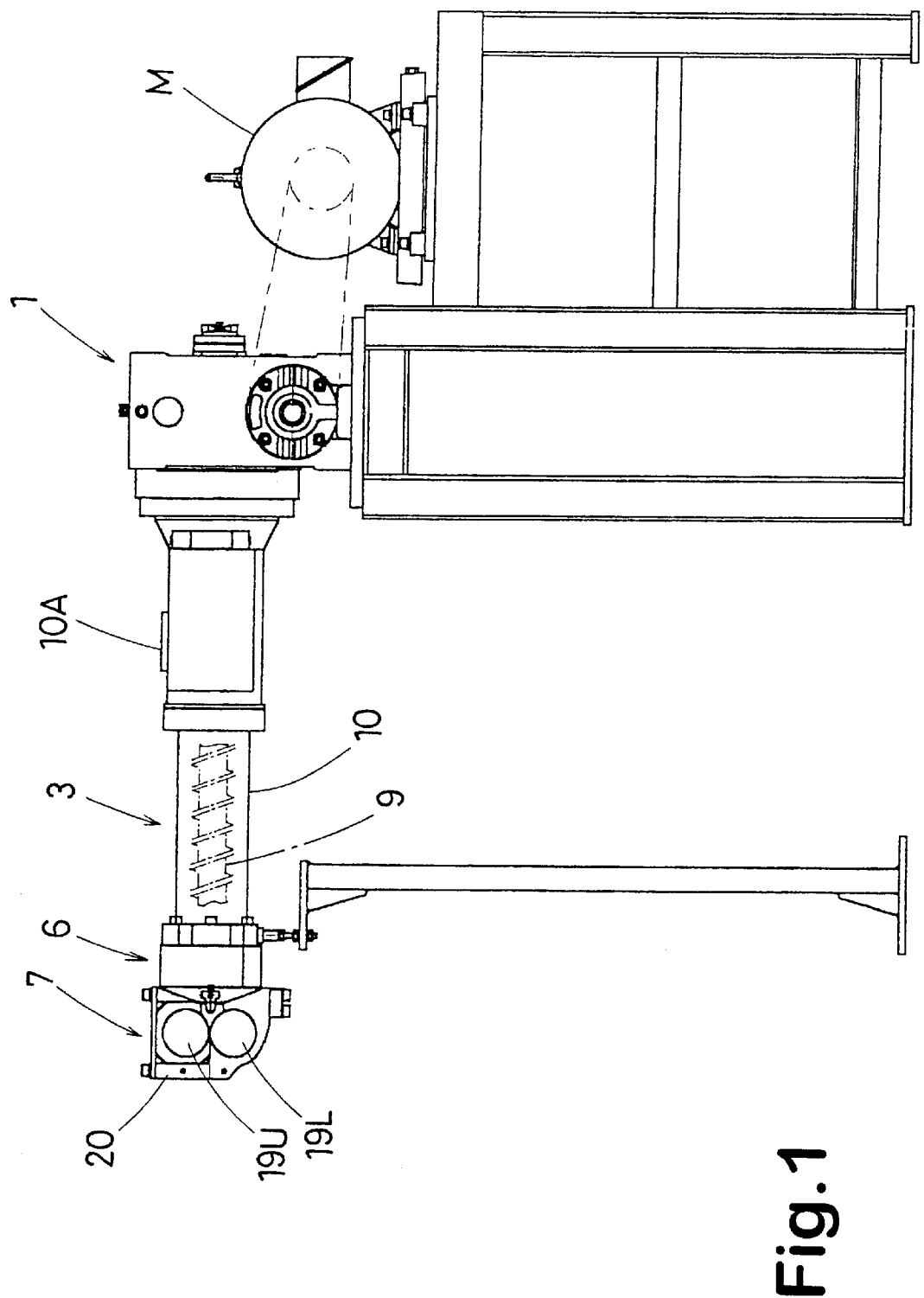
FIG. 1 is a side view of an apparatus for making an unvulcanized rubber tape according to the present invention.
Figure 2:
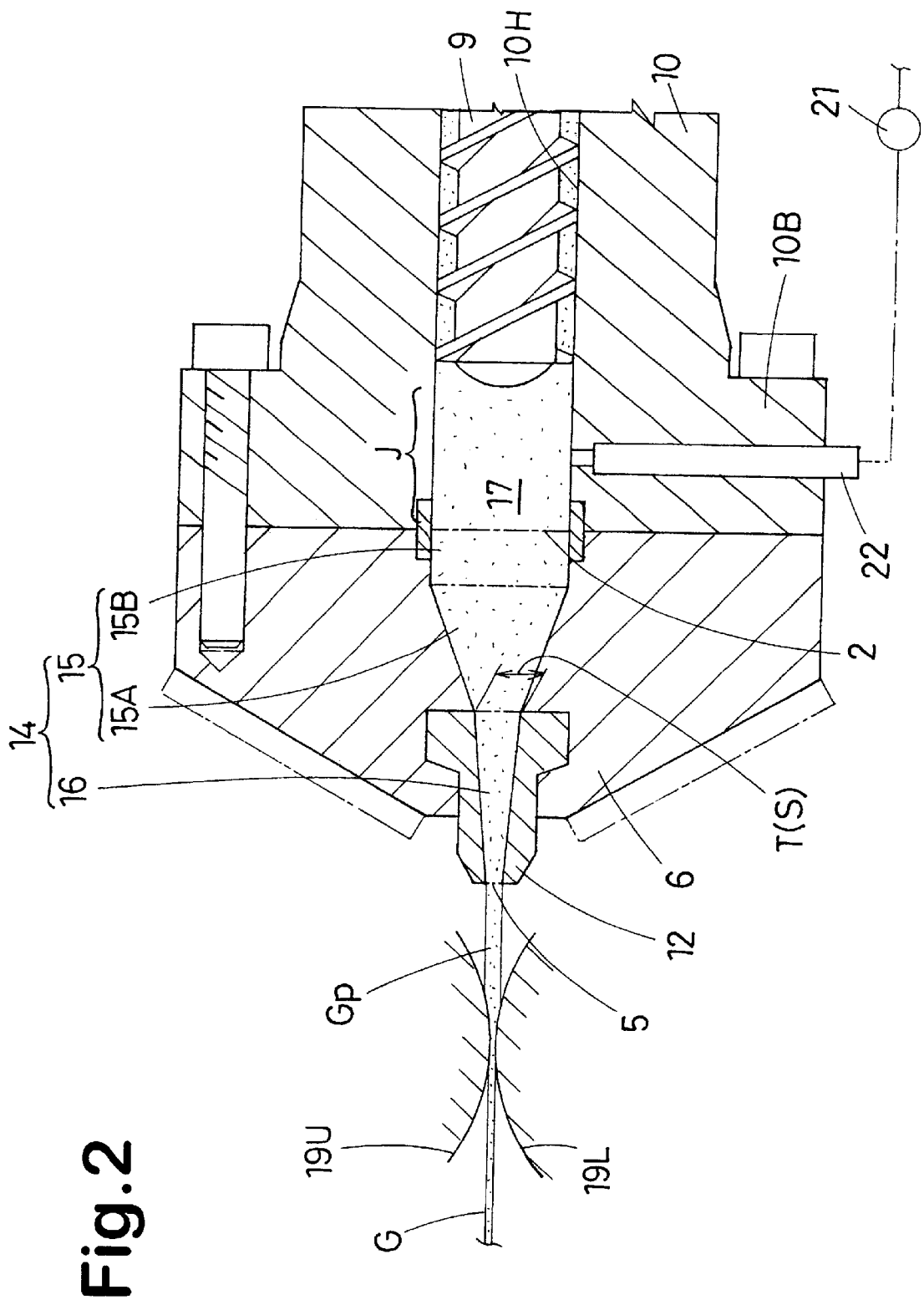
FIG. 2 is a cross sectional view of a tip part of the extruder thereof taken along a plane perpendicular to the widthwise direction of the tape.

The die 12 has a main portion put in the above-mentioned hollow part and a tip portion protruding therefrom. The main portion has a shape fit to that of the hollow part to engage each other as shown in FIG. 2. To realize this, the cylinder head 6 can be split into at least two parts. The split face may be a plane positioned at the thickness center of the hole 15. The die 12 has a hole 16 which extends from its rear end continuously from the hole 15 to its front end so as to open thereat defining an extruder outlet 5.

The above-mentioned holes 15 and 16 form a passage 14 for the unvulcanized rubber.

Figure 5:
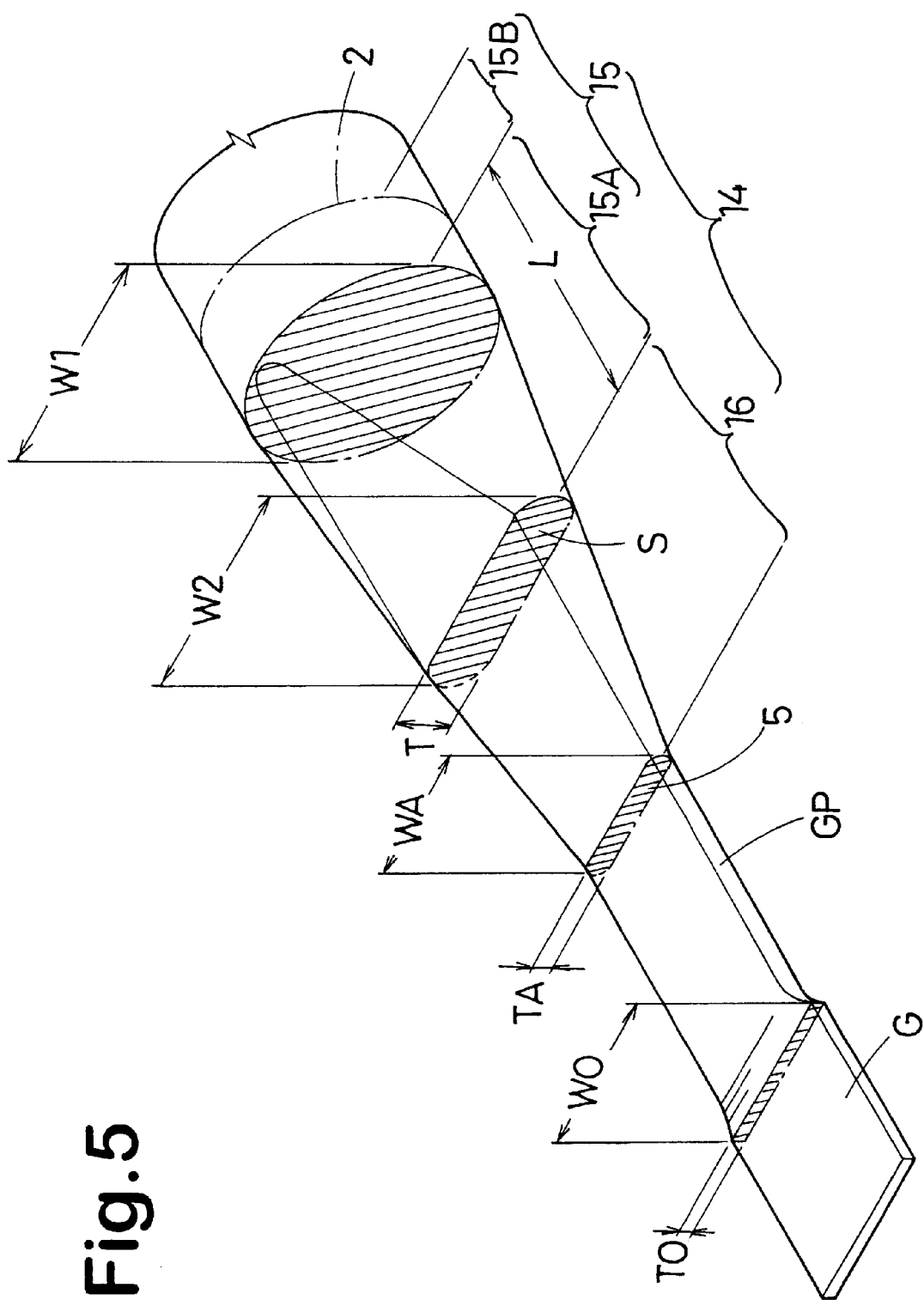
FIG. 5 is a perspective view showing the change of the cross sectional shape of the unvulcanized rubber.

The sectional shape of the passage 14 gradually changes from a circle at the opening 2 to a flat shape at the extruder outlet 5, while gradually decreasing the sectional area S and a height T in the thickness direction of the tape as shown in FIG. 5.

In this example, the above-mentioned hole 15 comprises a transforming part 15A whose sectional shape changes continuously from the circle to a flat shape and a cylindrical part 15B whose sectional shape is a constant circle and which extends from the opening 2 to the transforming part 15A. The diameter of the cylindrical part 15B is the same as the opening 2. In the cross sectional shape of the transforming part 15A, a pair of parallel sides having the same length continuously increase in the length from the upstream end to the downstream end of the transforming part 15A, and these sides each form an inclined flat plane which is substantially triangular. Between the ends of the parallel sides, two curved sides of a circular arc extend. The radius of the circular arc decreases continuously from the upstream end to the downstream end of the transforming part 15A.

At the downstream end of the transforming part 15A or the upstream end of the hole 16, the sectional shape already becomes a flat shape close to a flat rectangle rather than an oval due to its two parallel long straight sides. In the hole 16, the degree of change in the sectional area S and the degree of change in the height T are reduced in comparison with those in the transforming part 15A so as to decrease a residual stress in the extruded unvulcanized rubber GP. In the sectional shape of the hole 16, the two parallel long straight sides continuously decreases in the length and as a result, these straight sides each form an inclined flat trapezoidal plane. Between the ends of the straight sides, curved sides of a small radius arc extend. Thus, in this example, in the transforming part 15A, the height T is decreased at a constant rate. Also in the hole 16, the height T is decreased at a constant rate but smaller than that in the transforming part 15A. Similar to the height T, the sectional area S may be changed at a constant rate in each of the transforming part 15A and the hole 16. Thus, when only the passage 14 is considered, the border between the transforming part 15A and the hole 16 is regarded as a changing point of the rate of the decrease in the height T.

Near the extruder outlet 5, the upper and lower calender rollers 19U and 19L are disposed to adjust the thickness and width of the unvulcanized rubber Gp extruded from the extruder outlet 5. The rollers 19U and 19L are supported by a frame 20 fixed to the cylinder head 6. The upper calender roller 19U and the lower calender roller 19L rotate at the same speed but in the opposite directions. It is important that the changes of the thickness and width by rolling are restricted to small values in order to stably make a very thin unvulcanized rubber tape with accuracy.

Here, it is very important that the width W0 and thickness T0 of the finished unvulcanized rubber tape G, the width WA and height TA of the extruder outlet 5, the width W1 of the transforming part 15A at its upstream-side end, the width W2 of the transforming part 15A at its downstream-side end, the length L of the transforming part 15A along its central axis, and the pressure P in the passage 14 measured on the upstream side of the transforming part 15A satisfy the following relationships:

W2<W1+0.2×L
WA<W2
0.7×W0≦WA≦1.0×W0
1.5×T0≦TA<10.0×T0
P>40 kgf/sq.cm

If the width W2 is more than W1+0.2XL and/or the width WA is more than the width W2, then the flow of rubber to both side edges of the passage 14 becomes not enough and it becomes difficult to obtain the constant width W0.

If the width WA is less than 0.7 times the width W0 of the finished rubber tape G, as the amount of the roll processing excessively increases, the dimensional accuracy especially accuracy in the width and quality of the finished rubber tape G deteriorate.

It is preferable that the width WA is set in a range of from 0.8 to 0.9 times the width W0.

If the height TA is less than 1.5 times the thickness T0 of the finished rubber tape, then undulation is liable to occur on the rubber tape G causing unevenness in the thickness. If the height TA is more than 10 times the thickness T0, then the amount of the roll processing excessively increases and it becomes difficult to make the width stable.

It is preferable that the thickness TA is in a range of from 3 to 5 times the thickness T0.

If the inner pressure P is less than 40 kgf/sq.cm, then the width of the extruded rubber Gp is varied by variation of the delivery pressure of the screw and as a result the width of the rolled tape is also varied.

It is preferable that the pressure P is in a range of more than 60 kgf/sq.cm.

For example, when the thickness T0 is 0.8 mm and the width W0 is 22 mm, the widths W1 and W2 are 30 mm, the length L is 26.5 mm, the width WA is 18.0 mm, the height TA is 3.0 mm, the inner pressure P is 50 to 80 kgf/sq.cm, the diameters of the calender rollers are 80 mm.

Figure 3:
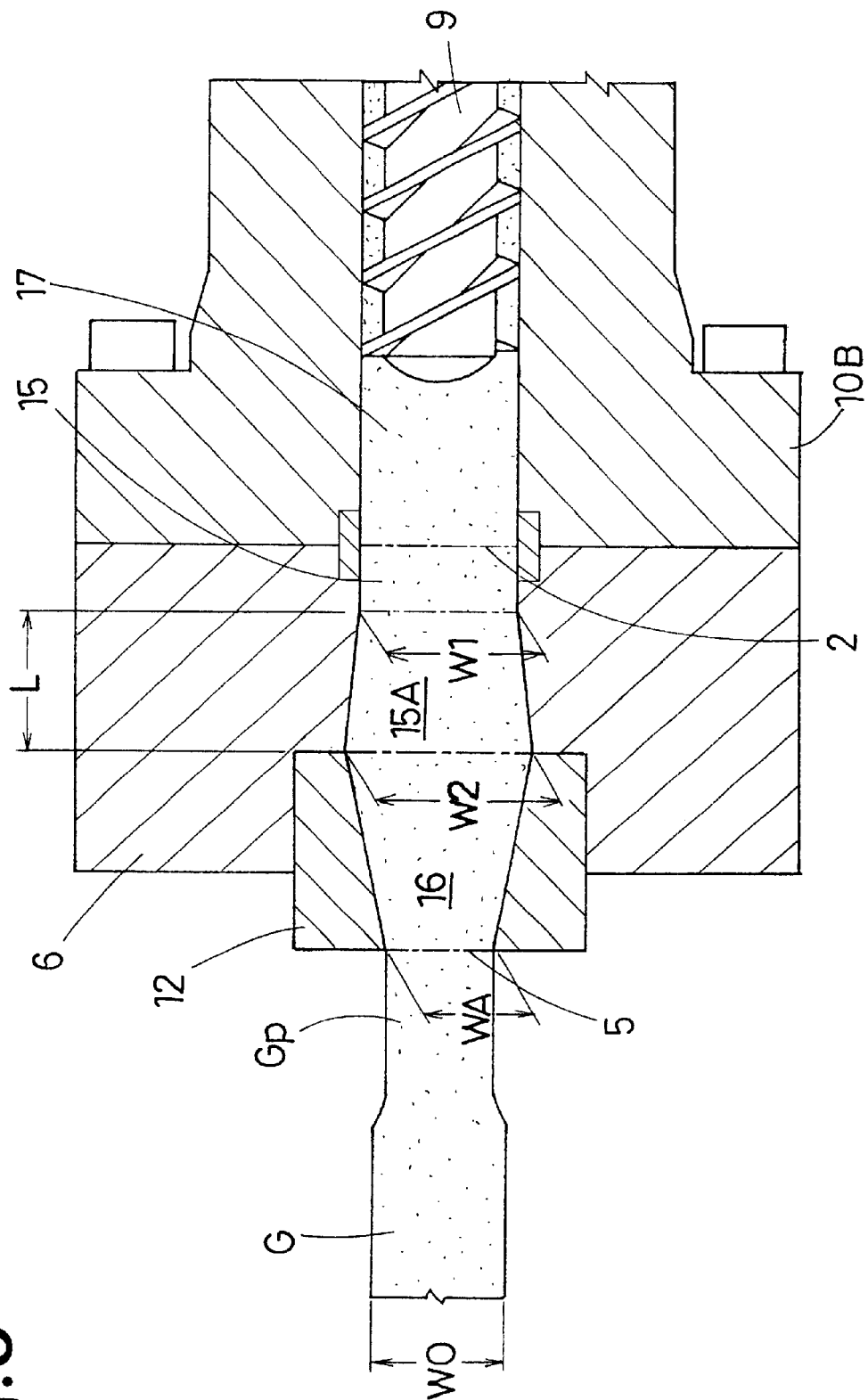
FIG. 3 is a cross sectional view of the tip part of the extruder taken along a plane parallel to the widthwise direction of the tape.
Figure 4:
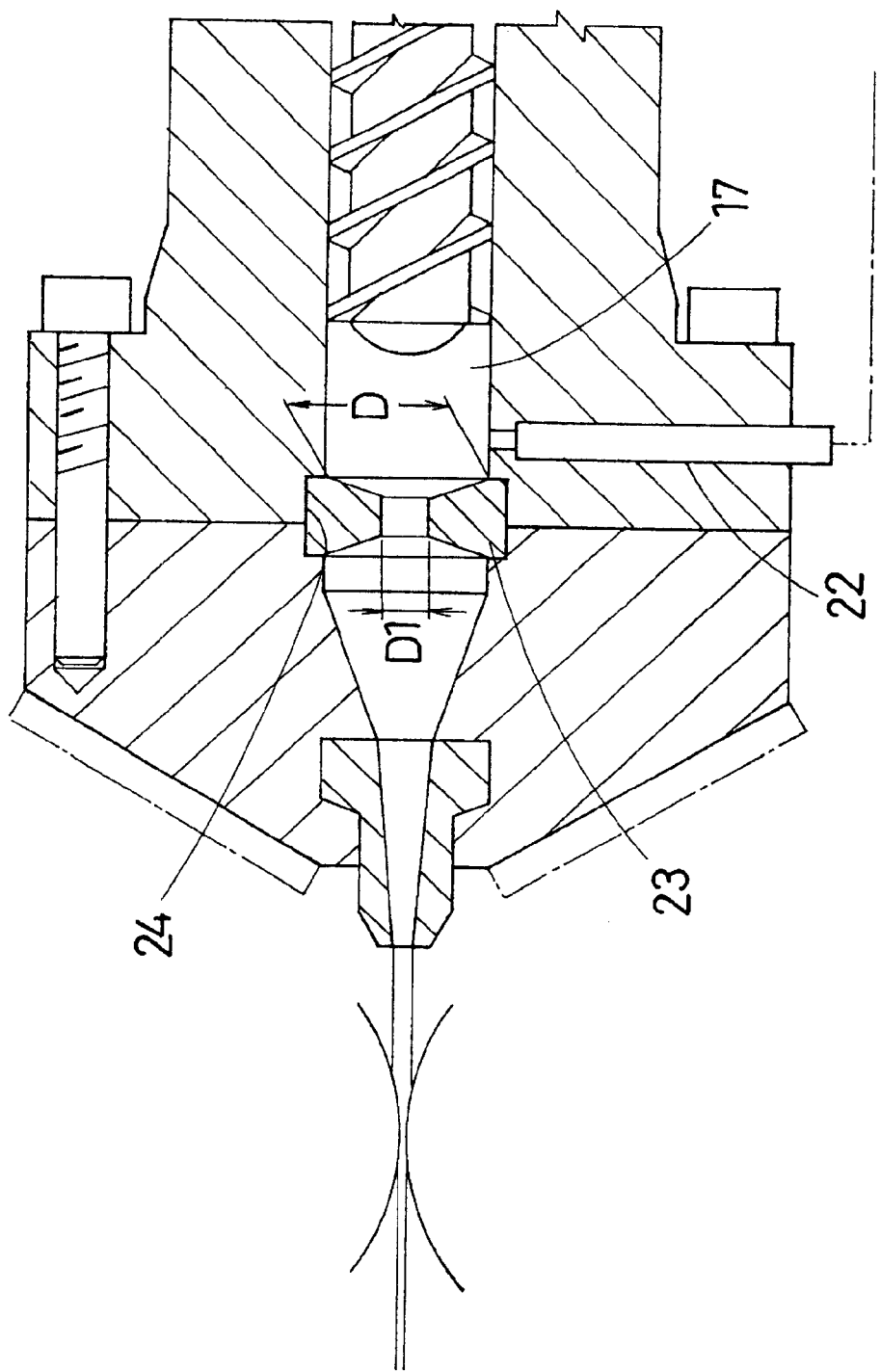
FIG. 4 is a cross sectional view similar to FIG. 2 but a throttle ring is provided in the passage.

FIG. 4 shows a state of the extruder provided between the passage 14 and the worm screw 9 with a throttle 23 in order to stabilize the pressure P of the unvulcanized rubber flowing into the passage 14 from the worn screw 9. In this example, the throttle 23 is defined by the aperture of a throttle ring which is disposed in a circular groove 24 formed along the joint between the cylinder head 6 and the cylinder block 10. The diameter D1 of the aperture is set in a range of from 0.5 to 0.2 times the inside diameter D of the hole 10H. In the state shown in FIGS. 2 and 3, a ring whose inside diameter is the same as the passage 14 and rubber pool 17 is disposed in the groove.

Between the above-mentioned groove for mounting the throttle ring and the worm screw, there is provided with a pressure sensor 22 for the delivery pressure of the worm screw. The output of the sensor 22 is given to a controller 21 for the electric motor M and the rotational speed thereof is controlled according to the delivery pressure so that the pressure becomes constant.

As descried above, in the present invention, the shape of the passage and the pressure are specifically defined. Therefore, the amount of the roll processing to the extruded rubber is decreased. Further, due to the increased pressure and the specific shape, influence of variation of the pressure on the extruded rubber such as variation of the thickness, width and residual stress can be decreased. Also the magnitude of the residual stress is decreased. As a result, it becomes possible to stably make a very thin unvulcanized rubber tape with accuracy in both of the width and thickness.

What is claimed is:

1. An apparatus for making an unvulcanized rubber tape having a finished thickness TO in a range of from 0.3 to 1.5 mm, comprising
    an extruder comprising a passage for unvulcanized rubber defining an outlet for the extruded unvulcanized rubber, and
    a pair of calendar rollers disposed near said outlet for adjusting the thickness of the extruded unvulcanized rubber passing therebetween,
    said passage comprised of
        a transforming part having an inlet for the unvulcanized rubber at its upstream-side end, and
        a thinning part on the downstream side thereof defining said outlet at its downstream-side end, said transforming part gradually changing in the cross sectional shape from a circle to a flat shape in the lower course of the passage, said thinning part having a flat cross sectional shape and gradually decreasing in thickness in the lower course of the passage, said thickness T0 and a width W0 of the unvulcanized rubber tape, a width W1 of said inlet, a width WA and a thickness TA of said outlet, a length L of the transforming part, a width W2 of the transforming part at its downstream-side end, and a pressure P of the unvulcanized rubber flowing into said inlet satisfy the following relationships $0.7 \times W0 \leqq WA \leqq 1.0 \times W0$ $1.5 \times T0 \leqq TA \leqq 10 \times T0$ $WA < W2 < W1 + 0.2 \times L$ $P > 40$ kgf/sq.cm.

2. The apparatus according to claim 1, wherein in said thinning part, the thickness decreases at a substantially constant rate, and in the transforming part, the thickness decreases at a rate greater than said substantially constant rate.

3. The apparatus according to claim 1, wherein said extruder includes a screw for pushing the unvulcanized rubber into said inlet of said passage, and a throttle disposed between said screw and said inlet of said passage.

4. The apparatus according to claim 1, wherein said extruder includes a screw for pushing the unvulcanized rubber into said inlet of said passage, a throttle disposed between said screw and said inlet of said passage, a sensor for determining the delivery pressure of the screw, and a controller for a motor driving the screw which, according to an output of the sensor, controls the rotational speed of the screw to maintain the delivery pressure at a predetermined level.

5. The apparatus according to claim 1, wherein said extruder includes a screw for pushing the unvulcanized rubber into said inlet of said passage, a sensor for determining the pressure of the unvulcanized rubber flowing into said inlet from the screw, and a controller for a motor driving the screw which, according to an output of the sensor, controls the rotational speed of the screw to maintain the pressure at a desired level.

* * * * *